United States Patent
Akikuni

(10) Patent No.: US 6,421,117 B1
(45) Date of Patent: Jul. 16, 2002

(54) APPARATUS FOR OPTICAL TIME DOMAIN REFLECTOMETRY ON MULTI-MODE OPTICAL FIBERS, A LIGHT SOURCE SECTION THEREOF, AND A PROCESS FOR PRODUCING THE LIGHT SOURCE SECTION

(75) Inventor: Keiko Akikuni, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/599,902

(22) Filed: Jun. 23, 2000

(30) Foreign Application Priority Data

Jun. 30, 1999 (JP) ............................................. 11-186859

(51) Int. Cl.$^7$ .............................................. G01N 21/00
(52) U.S. Cl. ..................................................... 356/73.1
(58) Field of Search ........................... 356/73.1; 385/93, 385/33

(56) References Cited

U.S. PATENT DOCUMENTS 5,074,682 A * 12/1991 Uno et al. ..................... 385/93
5,082,368 A * 1/1992 Fuchs et al. ................ 356/73.1

* cited by examiner

*Primary Examiner*—Frank G. Font
*Assistant Examiner*—Tu T. Nguyen
(74) *Attorney, Agent, or Firm*—Fish & Richardson PC

(57) ABSTRACT

A laser diode 11 and a lens 12 for focusing the rays of oscillated light from it are arranged such that the central axis 14 of the former aligns with the optical axis 15 of the latter. In addition, the lens 12 and the multi-mode optical fiber 13 into which the focused light beam is launched are coupled and fixed in such a way that the central axis 16 of the multi-mode optical fiber 13 is offset by a predetermined length in a direction normal to the axis of said alignment.

4 Claims, 4 Drawing Sheets

APPARATUS FOR OPTICAL TIME DOMAIN REFLECTOMETRY ON MULTI-MODE OPTICAL FIBERS, A LIGHT SOURCE SECTION THEREOF, AND A PROCESS FOR PRODUCING THE LIGHT SOURCE SECTION

BACKGROUND OF THE INVENTION

The present invention relates to an apparatus for optical time domain reflectometry (OTDR) on multi-mode optical fibers that is useful in surveillance of fiberoptics based transmission lines. The present invention particularly relates to an apparatus for optical time domain reflectometry on multi-mode fibers that detects the position of breaks in multi-mode optical fibers or measures the optical loss at connections or splices. The invention also relates to a light source section of an apparatus for optical time domain reflectometry on multi-mode optical fibers (which is hereunder referred to as an "apparatus for OTDR") and a process for producing the light source section.

FIG. 3 shows the construction of an apparatus for OTDR. As shown, the apparatus comprises a light source section 10 which outputs optical pulses, a light-receiving section 26 for receiving the back scattering and Fresnel reflection of optical pulses that are output from the light source section 10 to a multi-mode optical fiber 24 under analysis, a processing section 28 for processing an electric signal that is output from the light-receiving section 26, and a display section 30 for presenting the result of processing with the processing section 28. These components make up a measurement system which is connected by a coupler 20 to a dummy fiber 22 having the multi-mode optical fiber 24 connected at an end.

In the arrangement described above, optical pulses output from the light source section 10 are passed through the coupler 20 to be launched into the dummy fiber 22. At the same time, the back scattered light and Fresnel reflected light that are produced in the dummy fiber 22 and the multi-mode optical fiber 24 are passed through the coupler 20 to be received by the light-receiving section 26. Upon receiving the back scattered light and Fresnel reflected light, the light-receiving section 26 outputs electric signals which are averaged in the processing section 28 and thereafter sent to the display section 30 for image display.

The structure of the light source section of a conventional apparatus for OTDR is shown in FIG. 4. As shown, the light source section consists of a laser diode 11, a lens 12 and a multi-mode optical fiber 13. The multi-mode optical fiber 13 is selectable from two types which are typically 50 GI (with a core diameter of 50 $\mu$m) and 62.5 GI (with a core diameter of 62.5 $\mu$m). The laser diode 11 and the lens 12 are arranged such that the central axis 14 of the former aligns with the optical axis 15 of the latter. And, as shown in FIG. 5 (which is a partial enlarged view of FIG. 4), the lens 12 is coupled and fixed to the multi-mode optical fiber 13 in such a way that the central axis 16 of the latter coincides with the axis of the alignment. Indicated by 131 in FIG. 5 is the core of the optical fiber 13 and the reference numeral 132 represents the cladding of the same optical fiber 13.

In the light source section of the above-described conventional apparatus for OTDR, oscillated light from the laser diode is focused by the lens and launched into the multi-mode optical fiber. The laser diode, the lens and the multi-mode optical fiber are coupled and fixed as they are arranged such that the central axes of the laser diode and the multi-mode optical fiber align with the optical axis of the lens. It should be noted here that this arrangement may potentially introduce distortions in the waveforms of measurement with the apparatus for OTDR. To give an example, bubbles may be entrapped in the center of the core of a multi-mode optical fiber during manufacture and if this problem occurs, a measured optical loss is sometimes greater than what occurs to the same multi-mode optical fiber from the use of a light source section in steady-stated excitation.

The results of OTDR conducted on a multi-mode optical fiber using the light source section of the conventional apparatus for OTDR are described below with reference to FIG. 6. The horizontal axis of the graph in FIG. 6 plots the distance from the end face of the coupler 20 to the dummy fiber 22 and the vertical axis plots the reflection signal level. As the distance from the input end of the dummy fiber 22 to the light source section 10 (see FIG. 3) increases, the power of the incident light attenuates and the reflection signal level of the backscatter occurring in the dummy fiber 22 decreases progressively as indicated by a waveform 31.

If the optical pulses passing through the dummy fiber 22 reach the connector CN2, part of them is reflected by the connector C2 to produce a Fresnel reflection waveform 32 and the remaining pulses pass through the connector CN2 to be launched into the multi-mode optical fiber 24 under analysis, thereby producing back scattered light. Due to the losses inherent in the optical fiber, the reflection signal level of this back scattered light decreases progressively as indicated by a waveform 41. If the multi-mode fiber 13 in the light source section 10 is not kept excited in a steady state, the waveform from the multi-mode optical fiber 24 under analysis becomes distorted. Fresnel reflection occurs at the far end of the optical fiber 24 and this is observed as a waveform 42.

In order to ensure that the light source section 10 of the apparatus for OTDR is brought to steady-state excitation, the oscillated light from the laser diode 11 must spread to be wider than the numerical aperture (NA) of the multi-mode optical fiber. To this end, the oscillated light is focused with a lens having the same NA as the multi-mode optical fiber so that it falls at the central axis of the multi-mode optical fiber. However, if the light issued from the laser diode is allowed to fall at the central axis of the multi-mode optical fiber, it is not excited in a steady state since the spot diameter of the beam cannot be increased (the incident light is prone to propagate near the central axis of the multi-mode optical fiber since it has a comparatively high refractive index).

To achieve steady-state excitation of the multi-mode optical fiber without having this problem, a dummy fiber extending over a distance of several kilometers is connected upstream of the multi-mode optical fiber under analysis and, at the same time, a cylindrical lens must be added to the focusing lens to produce a circular cross section of the laser beam. However, this simply increases the complexity of the optical system in the light source section of the apparatus for OTDR.

Another way to bring the multi-mode optical fiber 24 to steady-state excitation is by using a light-emitting diode. However, a light-emitting diode outputs such a small emission level that if it is used on the apparatus for OTDR, the required dynamic range cannot be assured, making it difficult to perform measurements on an optical fiber spanning a long distance.

If a laser diode is used as a means of causing steady-state excitation, the optical system in the light source section becomes unduly complicated as already mentioned above.

To get around this difficulty, a high-power laser diode must be selected but then the overall construction of the light source in the apparatus for OTDR on multi-mode optical fibers becomes complicated, leading to higher manufacturing cost.

SUMMARY OF THE INVENTION

The present invention is accomplished under these circumstances and has as an object providing an apparatus for optical time domain reflectometry on multi-mode optical fibers which, in spite of its simple construction, can achieve artificial steady-state excitation of a multi-mode optical fiber and which is capable of correct measurements on the multi-mode optical fiber, along with better reproducibility of their result.

Another object of the present invention is to provide a light source section of the apparatus.

Yet another object of the present invention is to provide a process for producing the light source section.

The first object of the present invention can be attained by the apparatus of aspect 1 for optical time domain reflectometry on multi-mode optical fibers which comprises a light source section for outputting optical pulses, a light-receiving section for receiving the back scattering and Fresnel reflection of optical pulses that are output from the light source section to a multi-mode optical fiber under analysis, and a processing section for processing an electric signal that is output from the light-receiving section, the light source section having a light source, an optical system for focusing the light issuing from the light source, and a multi-mode optical fiber into which an optical beam focused by the optical system is launched, the light source and the optical system being arranged such that the central axis of the former aligns with the optical axis of the latter, and the optical system and the multi-mode optical fiber into which an optical beam focused by the optical system is launched being coupled in such a way that the central axis of the multi-mode optical fiber is offset by a predetermined length in a direction normal to the axis of the alignment.

The apparatus of aspect 1 for optical time domain reflectometry on multi-mode optical fibers is characterized in that its light source section consists of a light source, an optical system for focusing the light issuing from the light source, and a multi-mode optical fiber into which an optical beam focused by the optical system is launched and that the light source and the optical system are arranged such that the central axis of the former aligns with the optical axis of the latter, and the optical system and the multi-mode optical fiber into which an optical beam focused by the optical system is launched being coupled in such a way that the central axis of the multi-mode optical fiber is offset by a predetermined length in a direction normal to the axis of the alignment. With this simple construction, the multi-mode optical fiber can be brought to artificial steady-state excitation and correct measurement can be made on the multi-mode optical fiber under analysis, along with better reproducibility of the result of measurement.

The second object of the invention can be attained by the light source section of aspect 2 in an apparatus for optical time domain reflectometry on multi-mode optical fibers which comprises a light source section for outputting optical pulses, a light-receiving section for receiving the back scattering and Fresnel reflection of optical pulses that are output from the light source section to a multi-mode optical fiber under analysis, and a processing section for processing an electric signal that is output from the light-receiving section, the light source section having a light source, an optical system for focusing the light issuing from the light source, and a multi-mode optical fiber into which an optical beam focused by the optical system is launched, the light source and the optical system being arranged such that the central axis of the former aligns with the optical axis of the latter, and the optical system and the multi-mode optical fiber into which an optical beam focused by the optical system is launched being coupled in such a way that the central axis of the multi-mode optical fiber is offset by a predetermined length in a direction normal to the axis of the alignment.

The light source section of aspect 2 in an apparatus for optical time domain reflectometry on multi-mode optical fibers is characterized by consisting of a light source, an optical system for focusing the light issuing from the light source, and a multi-mode optical fiber into which an optical beam focused by the optical system is launched and also characterized in that the light source and the optical system are arranged such that the central axis of the former aligns with the optical axis of the latter, and the optical system and the multi-mode optical fiber into which an optical beam focused by the optical system is launched being coupled in such a way that the central axis of the multi-mode optical fiber is offset by a predetermined length in a direction normal to the axis of the alignment. With this simple construction, the multi-mode optical fiber can be brought to artificial steady-state excitation and correct measurement can be made on the multi-mode optical fiber under analysis, along with better reproducibility of the result of measurement.

The second object of the present invention can also be attained by the light source section of aspect 3 in an apparatus for optical time domain reflectometry on multi-mode optical fibers which comprises a light source section for outputting optical pulses, a light-receiving section for receiving the back scattering and Fresnel reflection of optical pulses that are output from the light source section to a multi-mode optical fiber under analysis, and a processing section for processing an electric signal that is output from the light-receiving section, the light source section having a laser diode, a lens for focusing the oscillated light from the light source, and a multi-mode optical fiber into which an optical beam focused by the lens is launched, the laser diode and the lens being arranged such that the central axis of the former aligns with the optical axis of the latter, and the lens and the multi-mode optical fiber into which an optical beam focused by the lens is launched being coupled in such a way that the central axis of the multi-mode optical fiber is offset by a predetermined length in a direction normal to the axis of the alignment.

The light source section of aspect 3 in an apparatus for optical time domain reflectometry on multi-mode optical fibers is characterized by consisting of a laser diode, a lens for focusing the oscillated light from the light source, and a multi-mode optical fiber into which an optical beam focused by the lens is launched and also characterized in that the laser diode and the lens are arranged such that the central axis of the former aligns with the optical axis of the latter, and the lens and the multi-mode optical fiber into which an optical beam focused by the lens is launched being coupled in such a way that the central axis of the multi-mode optical fiber is offset by a predetermined length in a direction normal to the axis of the alignment. With this simple construction, the multi-mode optical fiber can be brought to artificial steady-state excitation and correct measurement can be made on the multi-mode optical fiber under analysis, along with better reproducibility of the result of measurement.

The third object of the present invention is attained by the process of aspect 4 for producing a light source section of an apparatus for optical time domain reflectometry on multi-mode optical fibers which comprises a laser diode, a lens for focusing the oscillated light from the laser diode and a multi-mode optical fiber into which an optical beam focused by the lens is launched, the process comprising the steps of arranging the laser diode and the lens such that the central axis of the former aligns with the optical axis of the latter and coupling and fixing the lens and the multi-mode optical fiber, into which an optical beam focused by the lens is launched, in such a way that the central axis of the multi-mode optical fiber is offset by a predetermined length in a direction normal to the axis of the alignment.

The process of aspect 4 for producing a light source section of an apparatus for optical time domain reflectometry on multi-mode optical fibers is characterized by comprising the steps of arranging the laser diode and the lens such that the central axis of the former aligns with the optical axis of the latter and coupling and fixing the lens and the multi-mode optical fiber, into which an optical beam focused by the lens is launched, in such a way that the central axis of the multi-mode optical fiber is offset by a predetermined length in a direction normal to the axis of the alignment. Using this simple process, one can produce a light source section of an apparatus for optical time domain reflectometry on multi-mode optical fibers with which the multi-mode optical fiber can be brought to artificial steady-state excitation and correct measurement can be made on the multi-mode optical fiber under analysis, along with better reproducibility of the result of measurement

DETAILED DESCRIPTION OF THE PREFERRED EMBODIMENTS

Figure 3:
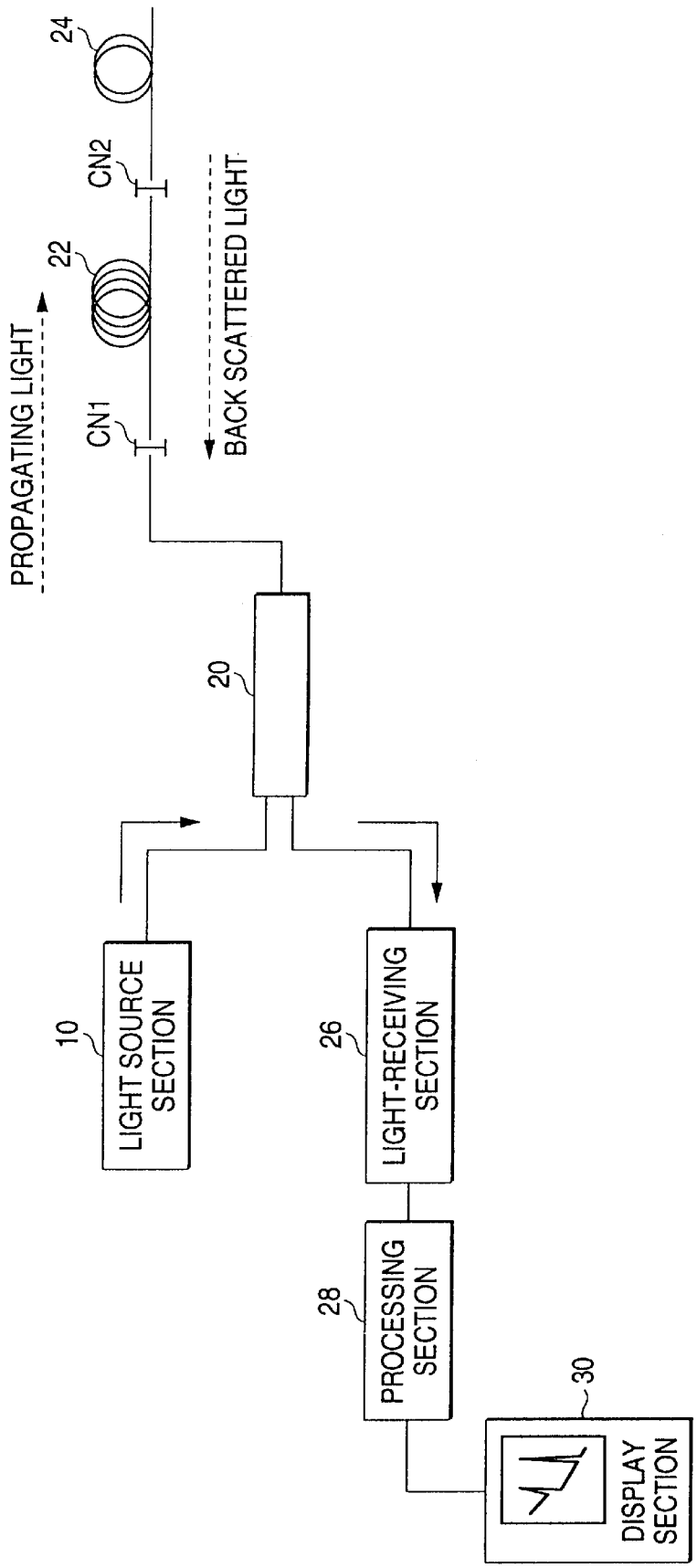
FIG. 3 is a block diagram showing the basic configuration of an apparatus for optical time domain reflectometry on multi-mode optical fibers which is common to the prior art and the embodiment of the invention.
Figure 4:
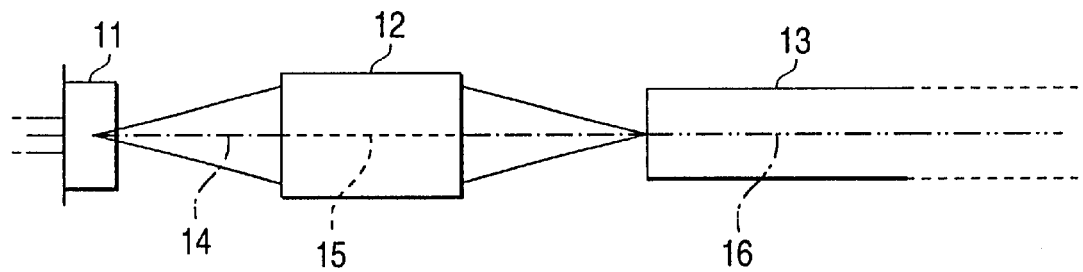
FIG. 4 illustrates the construction of the light source of a conventional apparatus for optical time domain reflectometry on multi-mode fibers.
Figure 5:
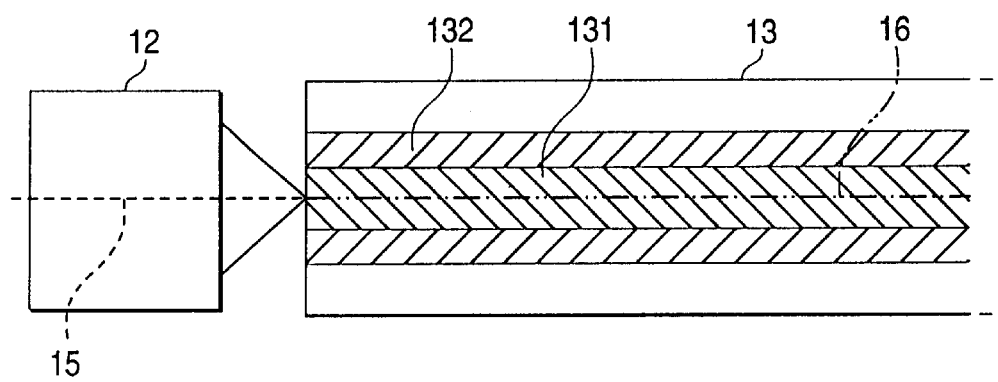
FIG. 5 is a partial enlarged view of the light source shown in FIG. 4.

We now describe an embodiment of the invention in detail by referring to accompanying drawings. Except for the light source section, an apparatus for OTDR on multi-mode optical fibers according to an embodiment of the invention has basically the same configuration as the prior art version shown in FIG. 3; hence, in the following description of the OTDR apparatus, we will refer to FIG. 3 whenever necessary. Let us start the description with the light source section of the OTDR apparatus which is shown schematically in FIG. 1.

Figure 1:
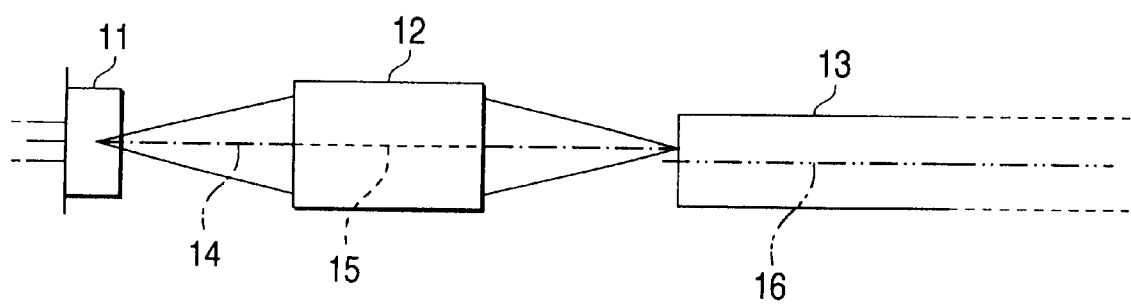
FIG. 1 illustrates the construction of the light source section of an apparatus for optical time domain reflectometry on multi-mode optical fibers according to an embodiment of the invention.

The light source section shown in FIG. 1 comprises a laser diode 11 as a light source, a lens 12 as an optical element for focusing the rays of light emerging from the laser diode 11, and a multi-mode optical fiber 13 into which the focused light beam is launched. Indicated by 14 is the central axis of the laser diode 11; reference numeral 15 represents the optical axis of the lens 12 and reference numeral 16 represents the central axis of the multi-mode optical fiber 13.

Figure 2:
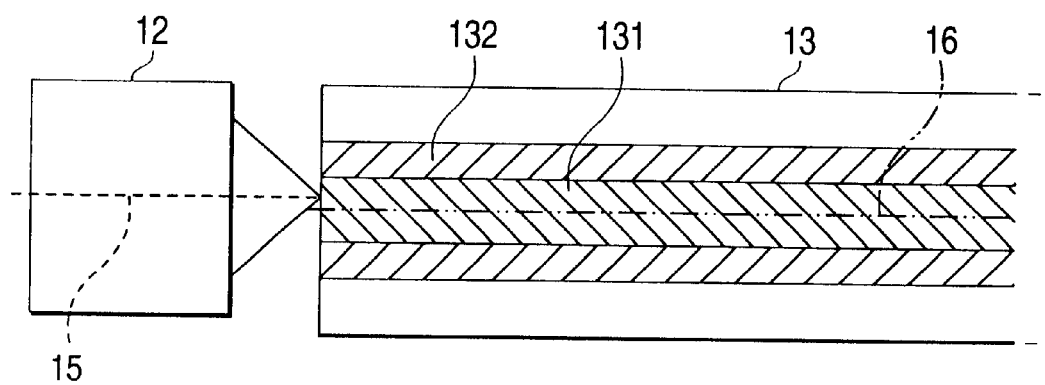
FIG. 2 is a partial enlarged view of the light source section shown in FIG. 1.

As is clear from FIG. 1, the laser diode 11 and the lens 12 for focusing the rays of oscillated light from it are arranged such that the central axis 14 of the former aligns with the optical axis 15 of the latter. In addition, as is clear from FIG. 2 (which. is a partial enlarged view of FIG. 1), the lens 12 (optical element) and the multi-mode optical fiber 13 into which the focused light beam is launched are coupled and fixed in such a way that the central axis 16 of the multi-mode optical fiber 13 is offset by a predetermined length in a direction normal to the axis of the alignment.

The light source section shown in FIG. 1 is used with an apparatus for OTDR on multi-mode optical fibers and may typically be produced by the following procedure. First, the laser diode 11 serving as a light source and the lens 12 for focusing the rays of oscillated light from it are arranged and fixed such that the central axis 14 of the former aligns with the optical axis 15 of the latter.

In the next step, an optical axis adjustment is made to bring the central axis 16 of the multi-mode optical fiber 13 into coincidence with the axis of the alignment. Consider here an XYZ rectangular coordinate system, in which the Z axis is the central axis 16 of the multi-mode optical fiber 13. The adjusted multi-mode optical fiber 13 is then offset in the direction of either the X or Y axis by a predetermined length, say, several micrometers to several tens of micrometers, preferably from 5 micrometers to 20 micrometers. As a result, one can produce the light source section of the apparatus for OTDR on multi-mode optical fibers according to the embodiment under consideration.

Figure 6:
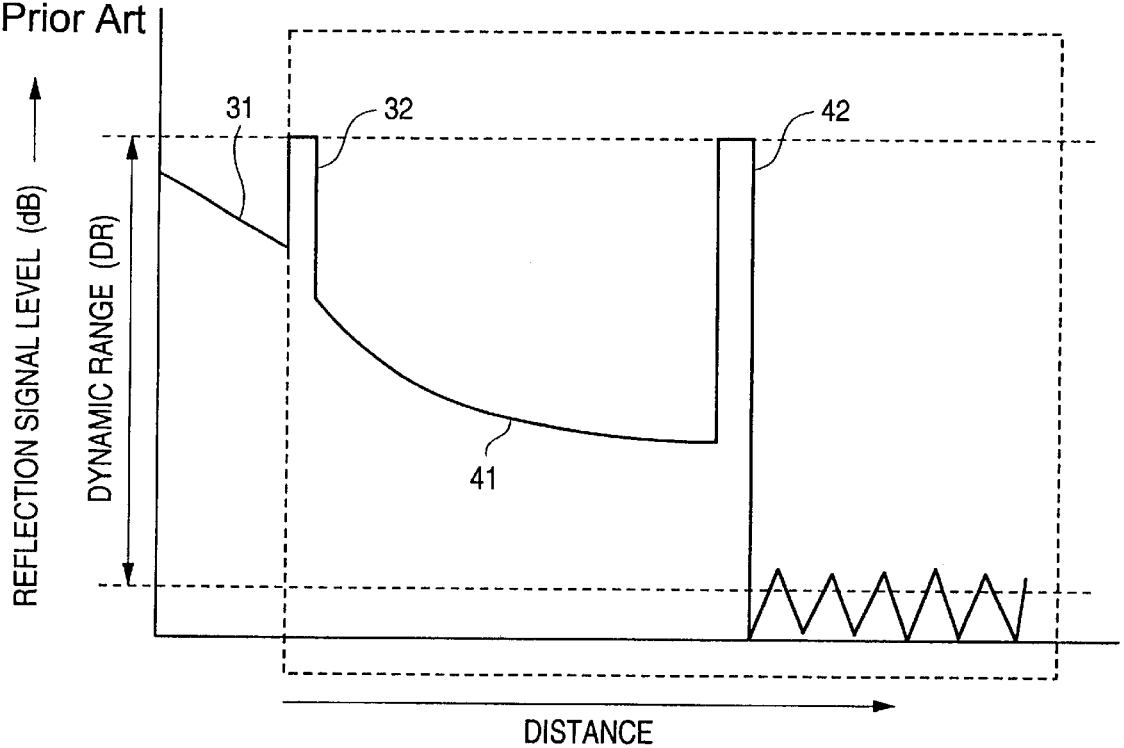
FIG. 6 is a characteristic diagram showing the result of analysis of a multi-mode optical fiber with a conventional apparatus for optical time domain reflectometry.
Figure 7:
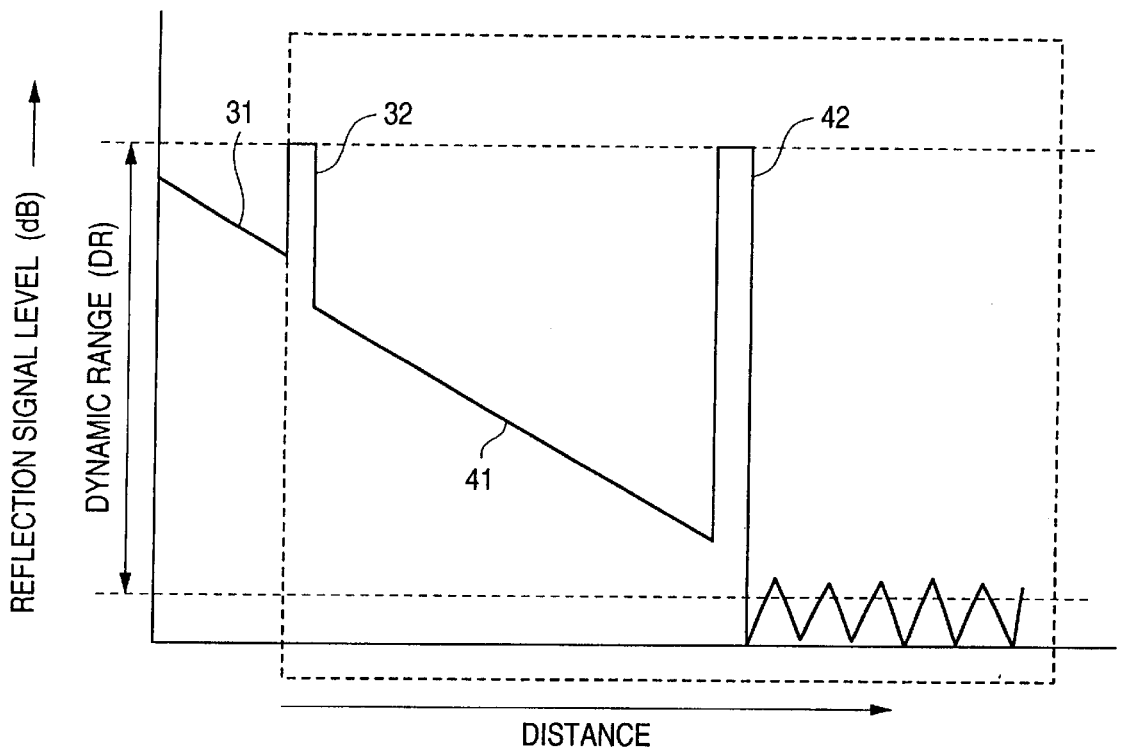
FIG. 7 is a characteristic diagram showing the result of analysis of a multi-mode optical fiber with the invention apparatus for optical time domain reflectometry.

Measurements is performed on a multi-mode optical fiber using the OTDR apparatus according to the embodiment under consideration. The results are shown in FIG. 7. As in FIG. 6, the horizontal axis of the graph plots the distance from the end face of the coupler 20 to the dummy fiber 22, and the vertical axis plots the reflection signal level. By comparing FIGS. 6 and 7, one can readily see that the OTDR apparatus of the invention sufficiently improves the linearity of the waveform of back scattered light travelling along the optical fiber under analysis, thus allowing for more correct measurement than the conventional apparatus.

The OTDR apparatus according to the embodiment of the invention allows the light source section to be conveniently excited in a steady state and, hence, enables correct fiber analysis. In addition, the additivity (linearity) of measured signals with respect to the installed span of multi-mode optical fiber is improved, along with better reproducibility of the result of measurement.

According to one adaptation of the light source section shown in FIG. 1, a plurality of lens elements are used to make up a confocal system and a light source section employing it as an optical system will bring about the same result.

As described on the foregoing pages, the apparatus of aspect 1 for optical time domain reflectometry on multi-mode optical fibers is characterized in that its light source section consists of a light source, an optical system for focusing the light issuing from the light source, and a multi-mode optical fiber into which an optical beam focused by the optical system is launched and that the light source and the optical system are arranged such that the central axis of the former aligns with the optical axis of the latter, and the optical system and the multi-mode optical fiber into which an optical beam focused by the optical system is launched being coupled in such a way that the central axis of the multi-mode optical fiber is offset by a predetermined length in a direction normal to the axis of the alignment. With this simple construction, the multi-mode optical fiber can be brought to artificial steady-state excitation and correct measurement can be made on the multi-mode optical fiber under analysis, along with better reproducibility of the result of measurement.

The light source section of aspect 2 in an apparatus for optical time domain reflectometry on multi-mode optical fibers is characterized by consisting of a light source, an optical system for focusing the light issuing from the light source, and a multi-mode optical fiber into which an optical beam focused by the optical system is launched and also characterized in that the light source and the optical system are arranged such that the central axis of the former aligns with the optical axis of the latter, and the optical system and the multi-mode optical fiber into which an optical beam focused by the optical system is launched being coupled in such a way that the central axis of the multi-mode optical fiber is offset by a predetermined length in a direction normal to the axis of the alignment. With this simple construction, the multi-mode optical fiber can be brought to artificial steady-state excitation and correct measurement can be made on the multi-mode optical fiber under analysis, along with better reproducibility of the result of measurement.

The light source section of aspect 3 in an apparatus for optical time domain reflectometry on multi-mode optical fibers is characterized by consisting of a laser diode, a lens for focusing the oscillated light from the light source, and a multi-mode optical fiber into which an optical beam focused by the lens is launched and also characterized in that the laser diode and the lens are arranged such that the central axis of the former aligns with the optical axis of the latter, and the lens and the multi-mode optical fiber into which an optical beam focused by the lens is launched being coupled in such a way that the central axis of the multi-mode optical fiber is offset by a predetermined length in a direction normal to the axis of the alignment. With this simple construction, the multi-mode optical fiber can be brought to artificial steady-state excitation and correct measurement can be made on the multi-mode optical fiber under analysis, along with better reproducibility of the result of measurement.

The process of aspect 4 for producing a light source section of an apparatus for optical time domain reflectometry on multi-mode optical fibers is characterized by comprising the steps of arranging the laser diode and the lens such that the central axis of the former aligns with the optical axis of the latter and coupling and fixing the lens and the multi-mode optical fiber, into which an optical beam focused by the lens is launched, in such a way that the central axis of the multi-mode optical fiber is offset by a predetermined length in a direction normal to the axis of the alignment. Using this simple process, one can produce a light source section of an apparatus for optical time domain reflectometry on multi-mode optical fibers with which the multi-mode optical fiber can be brought to artificial steady-state excitation and correct measurement can be made on the multi-mode optical fiber under analysis, along with better reproducibility of the result of measurement.

What is claimed is:

1. An apparatus for optical time domain reflectometry on multi-mode optical fibers comprising:

a light source section for outputting optical pulses, a light-receiving section for receiving the back scattering and Fresnel reflection of optical pulses that are output from said light source section to a multi-mode optical fiber under analysis, and a processing section for processing an electric signal that is output from said light-receiving section, wherein said light source section has a light source, an optical system for focusing the light issuing from said light source, and a multi-mode optical fiber into which an optical beam focused by said optical system is launched, said light source and said optical system are arranged such that the central axis of said light source aligns with the optical axis of said optical system, and said optical system and the multi-mode optical fiber into which an optical beam focused by said optical system is launched are coupled in such a way that the central axis of said multi-mode optical fiber is offset from a focusing point of the optical system by a predetermined length in a direction normal to the axis of said alignment.

2. A light source section of an apparatus for optical time domain reflectometry on multi-mode optical fibers comprising:

a light source section for outputting optical pulses, a light-receiving section for receiving the back scattering and Fresnel reflection of optical pulses that are output from said light source section to a multi-mode optical fiber under analysis, and a processing section for processing an electric signal that is output from said light-receiving section, wherein said light source section has a light source, an optical system for focusing the light issuing from said light source, and a multi-mode optical fiber into which an optical beam focused by said optical system is launched, said light source and said optical system are arranged such that the central axis of said light source aligns with the optical axis of said optical system, and said optical system and the multi-mode optical fiber into which an optical beam focused by said optical system is launched are coupled in such a way that the central axis of said multi-mode optical fiber is offset from a focusing point of the optical system by a predetermined length in a direction normal to the axis of said alignment.

3. A light source section of an apparatus for optical time domain reflectometry on multi-mode optical fibers comprising:

a light source section for outputting optical pulses, a light-receiving section for receiving the back scattering and Fresnel reflection of optical pulses that are output from said light source section to a multi-mode optical fiber under analysis, and a processing section for processing an electric signal that is output from said light-receiving section, wherein said light source section has a laser diode, a lens for focusing the oscillated light from said light source, and a multi-mode optical fiber into which an optical beam focused by said lens is launched, said laser diode and said lens are arranged such that the central axis of said laser diode aligns with the optical axis of said lens, and said lens and the multi-mode optical fiber into which an optical beam focused by said lens is launched are coupled in such a way that the central axis of said multi-mode optical fiber is offset from a focusing point of the lens by a predetermined length in a direction normal to the axis of said alignment.

4. A process for producing a light source section of an apparatus for optical time domain reflectometry on multi-mode optical fibers which comprises a laser diode, a lens for focusing the oscillated light from said laser diode and a multi-mode optical fiber into which an optical beam focused by said lens is launched, said process comprising the steps of:
arranging said laser diode and said lens such that the central axis of said laser diode aligns with the optical axis of said lens, and coupling to fix said lens and the multi-mode optical fiber, into which an optical beam focused by said lens is launched, in such a way that the central axis of said multi-mode optical fiber is offset from a focusing point of the lens by a predetermined length in a direction normal to the axis of said alignment.

* * * * *